UNITED STATES PATENT OFFICE.

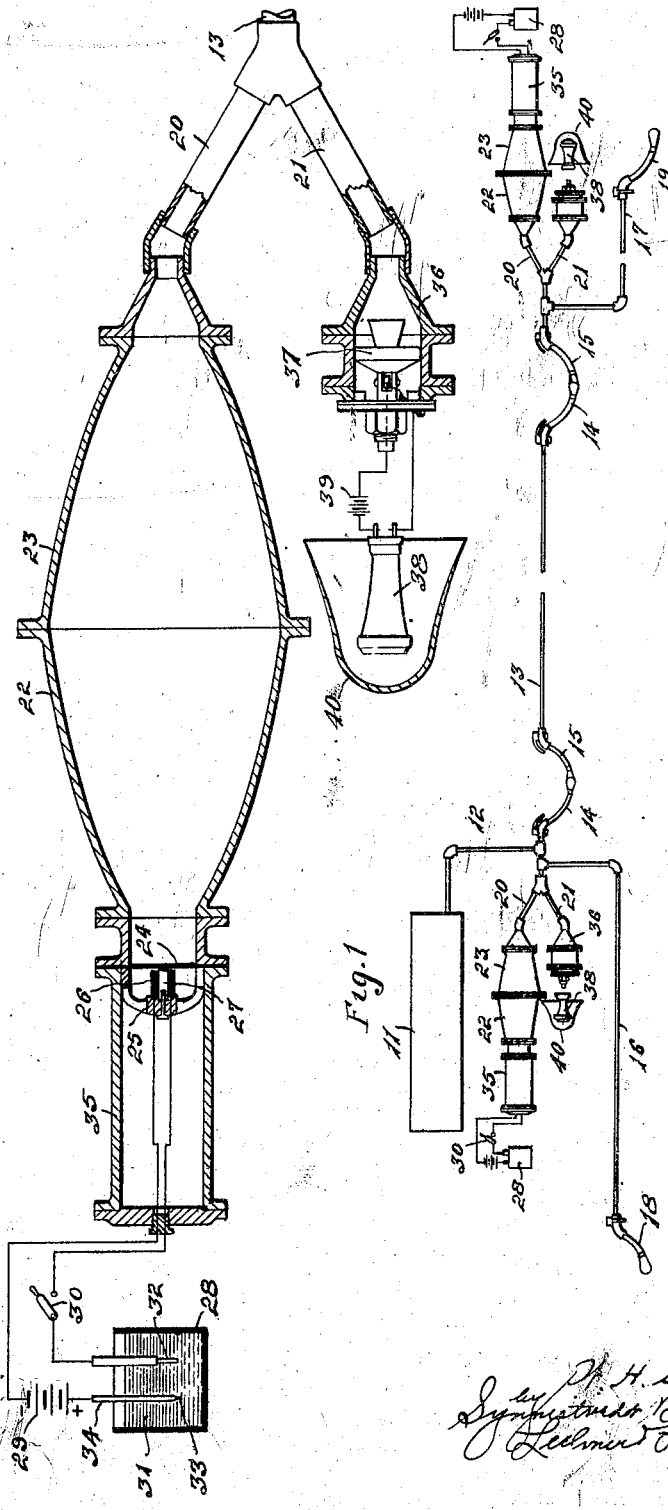

WILLIAM H. STEVENS, OF ALTOONA, PENNSYLVANIA.

SIGNALING APPARATUS.

1,221,621.   Specification of Letters Patent.   Patented Apr. 3, 1917.

Application filed April 18, 1916. Serial No. 91,860.

*To all whom it may concern:*

Be it known that I, WILLIAM H. STEVENS, a citizen of the United States, residing at Altoona, in the county of Blair and State of Pennsylvania, have invented certain new and useful Improvements in Signaling Apparatus, of which the following is a specification.

The invention relates to signaling apparatus, and particularly to apparatus which employs a tube as a line for carrying sounds. It has for its primary objects; the provision of means for amplifying the signaling sound in tube transmission; the provision of tube signaling apparatus capable of transmitting sound signals of a character and tone which can be distinguished clearly above other sounds and noises tending to interfere with ordinary sound transmission; and the provision of a signaling apparatus which is particularly adapted for train service and with which the ordinary air brake train line, or brake pipe as it is termed, can be utilized as a signal line for telephonic or other signal communication. Certain embodiments of the invention are illustrated in the accompanying drawings, wherein—

Figure 1 is a diagrammatic view showing the application of the invention to railway service, and Fig. 2 is an enlarged section, partially diagrammatic, through a portion of the apparatus of Fig. 1.

The Figs. 1 and 2 illustrate the use for which my invention was primarily designed, that is, for signaling work upon trains wherein it is often desirable to signal from one end of a train to the other. Because of sound interference due to the operation of the train signals other than by voice transmission are preferable because of their greater distinctness, and there are other reasons why it is not desirable to have a system employing voice transmission in train service.

I preferably use signals of such a pitch as to produce a musical tone, as such a signal can be readily distinguished from the various noises incident to train service, and I have found tone corresponding to 600 vibrations per second to be satisfactory, but this tone may be raised or lowered as desired. I have also found that I can utilize the brake pipe as a sound transmission conduit. This pipe provides a continuous line under a pressure of 60 pounds or more per square inch, extending from the rearmost car or caboose to the engine.

Referring to Fig. 1, which shows diagrammatically the application of the apparatus to train service, 11 is the main reservoir on the locomotive communicating by means of the pipe 12 with the brake pipe 13. 14 and 15 are the hose connections at the ends of the cars, such hose connections constituting a part of the brake line. 16 and 17 are pipe connections leading from the brake pipe to the hose connections 18 and 19 by means of which the brake pipe can be coupled to the engine or car ahead of the locomotive, or to an engine or car behind the caboose. Fig. 1 illustrates only two sets of transmission apparatus, one located on the locomotive and the other on the caboose, but it will be understood that other sets of apparatus may be connected to the brake pipe from other cars when desired.

Fig. 2 illustrates the construction of the transmission and receiving apparatus on an enlarged scale. As here illustrated, there are two branches 20 and 21 leading from the brake pipe, the branch 20 leading to the transmission apparatus and the branch 21 leading to the receiving apparatus. The transmitting apparatus comprises the conical members 22 and 23; the diaphragm 24, preferably of iron; the magnet 25 having the winding 26 and the pole piece 27; the electrolytic interrupting cell 28; the battery 29; and the push button or switch 30.

The electrolytic interrupting cell is of the ordinary type comprising a weak sulfuric acid solution 31, the lead negative member 32, and the platinum positive member 33, protected except at its point by the glass tube 34. When the push button or switch 30 is closed the formation and release of the bubbles of hydrogen gas upon the platinum point 33 causes the interruption of the current, which interruption may be made as rapid as desired by adjusting the size of the platinum point. Numerous other types of interrupters might be used for securing the rapid make and break of the circuit.

When the switch or push button 30 is closed, a rapid making and breaking of the circuit is produced by the electrolytic interrupter and this causes a corresponding vibration of the diaphragm 24. These vibrations are made with sufficient rapidity to produce a musical tone such as is best suited for the work in hand, 600 vibrations per second giving a satisfactory tone. In order to obtain resonance, I preferably employ a resonating tube 35 corresponding to a closed organ tube and being made of such length as to give the greatest reinforcing effect to the tone produced, the length of this tube depending upon the tone produced. A small port, not shown, is preferably provided between the member 22 and cylinder 35 so that the pressure on the two sides of the diaphragm is balanced. The members 22 and 23 are parabolic cylinders with the diaphragm 24 at or adjacent the focus of the parabola constituting the interior surface of the member 22, so that there is a minimum loss in the transmission of sound from the diaphragm 24 to the pipe or branch 20.

The sound transmitted through the branch 20 is received by a branch or pipe at the other end of the line corresponding to the branch 21 of Fig. 2. This branch 21 carries a receiving apparatus including a casing 36 carrying a telephone transmitter 37 of ordinary type and connected to a telephone receiver 38 of ordinary type, a battery 39 being employed in the circuit in order to increase the effect. The receiver 38 is preferably located with its diaphragm at the focus of a parabolic resonator 40 so that a maximum sound effect will be secured. The operation of the sound waves in the conduit or brake pipe in securing the vibration of the diaphragm of the transmitter 37 and of the receiver 38 will be readily understood without further explanation.

The foregoing is merely illustrative of my invention as applied to train service, as the invention is capable of wide variation depending upon requirements. I regard the feature of using a musical tone as important but not essential, and also the feature of utilizing the brake pipe as a conduit for sound transmission, since the brake tube normally contains air under pressure sufficient for the purpose, and the necessity of a separate transmission line is thus avoided. This is very important from a practical standpoint. Various other means might obviously be employed for magnifying the tone production as secured by the vibrations of the air in the tube, and various other means might be employed for securing the necessary interruption of the current, and my invention contemplates any and all means for securing this result.

What I claim is:

1. In combination in signaling apparatus, a transmission conduit containing a gas, a transmitter diaphragm positioned so as to impart, when vibrated, pulsations to the gas, a closed resonating tube in communication with the diaphragm on the side remote from the conduit, and a receiver for the pulsations.

2. In combination in signaling apparatus, a train brake pipe containing air under operating pressure, and a mechanically operated sound producing means and a receiver connected thereto at separated points, whereby pulsations may be imparted to the compressed air in the pipe by the sound producing means and transmitted to the receiver.

3. In combination in signaling apparatus, a train brake pipe containing air under operating pressure, a mechanically operated sound producing means connected to the pipe and constructed to give vibrations to the air in the pipe of a frequency such as to produce a musical tone, and a receiver connected to the pipe at a point remote from the sound producing means and adapted to receive the pulsations of air from the pipe and reproduce the musical tone.

4. In combination in signaling apparatus, a train brake pipe containing air under operating pressure, mechanically operated means for giving the air in the pipe vibrations of a frequency such as to produce a musical tone, an electromagnetic transmitter having a diaphragm in contact with the compressed air of the pipe at a point remote from the vibration producing means, a sound producing mechanism located adjacent said electromagnetic transmitter, and electrical connections from the transmitter whereby the vibrations of the transmitter diaphragm cause the actuation of the sound producing means.

WILLIAM H. STEVENS.